US005496576A

United States Patent [19]

Jeong

[11] Patent Number: 5,496,576

[45] Date of Patent: Mar. 5, 1996

[54] METHOD FOR THAWING FOOD IN MICROWAVE OVEN

[75] Inventor: Suk D. Jeong, Kyungsangnam-Do, Rep. of Korea

[73] Assignee: Goldstar Co., Ltd., Seoul, Rep. of Korea

[21] Appl. No.: 309,689

[22] Filed: Sep. 21, 1994

[30] Foreign Application Priority Data

Sep. 28, 1993 [KR] Rep. of Korea .................. 20284/1993

[51] Int. Cl.[6] .............................. A23L 1/025; H05B 6/68

[52] U.S. Cl. .......................... 426/233; 426/241; 219/703; 219/707

[58] Field of Search .................................... 426/233, 241; 99/325; 219/703, 705, 707

[56] References Cited

U.S. PATENT DOCUMENTS

| | | | |
|---|---|---|---|
| 4,376,131 | 3/1983 | Mori et al. | 426/241 X |
| 4,453,066 | 6/1984 | Mori | 219/703 |
| 4,590,350 | 5/1986 | Ueda | 219/705 |
| 4,705,926 | 11/1987 | Sakai et al. | 219/703 |
| 4,754,112 | 6/1988 | Hiroshima | 219/707 |
| 4,841,111 | 6/1989 | Kokkeler et al. | 219/703 |
| 4,874,928 | 10/1989 | Kasai | 219/707 X |
| 4,882,462 | 11/1989 | Husslein et al. | 219/703 X |
| 4,998,001 | 3/1991 | Cigarini et al. | 219/703 |
| 5,319,171 | 6/1994 | Tazawa | 219/703 X |

*Primary Examiner*—Steven Weinstein
*Assistant Examiner*—Milton I. Cano

[57] ABSTRACT

A method of automatically thawing a food in a microwave oven, is disclosed. The method of optimally thawing the food and preventing a phenomenon that the food is partially boiled. The method includes by primarily heating the food for a predetermined time where the food is large in amount, turning the primarily heated food and then additionally heating the turned food, while eliminating the step of turning the food where the food is small in amount.

9 Claims, 5 Drawing Sheets

METHOD FOR THAWING FOOD IN MICROWAVE OVEN

BACKGROUND OF THE INVENTION

1. Field of the Invention

The present invention relates to a method for thawing a food in a microwave oven, and more particularly to a food thawing method involving a procedure of turning a food by a user upon thawing the food, capable of preventing the food from being partially boiled and thereby achieving an optimum thawing.

2. Description of the Background Art

Referring to FIG. 1, there is shown a thawing device equipped in a microwave oven. As shown in FIG. 1, the thawing device includes a heating chamber 1 for heating a food 2 disposed therein. A turntable 3 is rotatably disposed in the heating chamber 1. The turntable 3 supports the food 2 thereon. Beneath the turntable 3, a weight sensor 4 is disposed which serves to sense the weight of food 2 laid on the turntable 3. The thawing device further includes a microcomputer 5 for calculating a thawing time for the food 2 based on an output signal from the weight sensor 4 and controlling various parts of the microwave oven, a time display unit 6 for displaying the thawing time under a control of the microcomputer 5, a magnetron 8 for generating a radio frequency wave, and an output control unit 7 for controlling driving of the magnetron 8 under a control of the microcomputer 5.

The operation of the thawing device having the above-mentioned construction will now be described.

When a user lays the food 2 to be thawed on the turntable 3 disposed in the heating chamber 1, the weight sensor 4 disposed beneath the turntable 3 senses the weight of food 2 and generates an electrical signal indicative of the sensed weight. The output signal from the weight sensor 4 is sent to the microcomputer 5 which, in turn, calculates a thawing time for the food 2, based on the received signal. On the basis of the calculated thawing time, the microcomputer 5 controls the time display unit 6 to display the total thawing time and simultaneously sends a control signal to the output control unit 7. In accordance with the control signal from the microcomputer 5, the output control unit 7 activates the magnetron 8 to oscillate. As the magnetron 8 oscillates, radio frequency wave energy is applied to the food 2, thereby causing the food 2 to be thawed.

FIG. 2 is a flow chart illustrating the procedure of calculating the thawing time and controlling thawing of the food 2 based on the calculated thawing time by the microcomputer 5. This procedure will now be described, in conjunction with FIG. 2.

As shown in FIG. 2, first, the microcomputer 5 checks whether a currently input key signal corresponds to an automatic thawing key signal. Where the current input key signal does not correspond to the automatic thawing key signal, a function according to the current input key signal is carried out. Where the current input key signal corresponds to the automatic thawing key signal, the microcomputer 5 checks a door condition of the microwave oven. When the door is at its opened state, the microcomputer 5 returns to the step of checking whether the current input key signal corresponds to the automatic thawing key signal and then begins its control operation again. On the other hand, when the door is at its closed state, the microcomputer 5 receives an output signal from the weight sensor 4 and then calculates a weight Wo of the food 2, based on the received signal. Based on the calculated food weight Wo, the microcomputer 5 also calculates a thawing time Tw for the food 2. Thereafter, the microcomputer 5 controls the output control unit 7 on the basis of the calculated thawing time Tw so that the magnetron 8 begins to oscillate, thereby heating the food 2. When a time taken to heat the food 2 reaches the calculated thawing time Tw, the microcomputer 7 controls the output control unit 7 to stop the oscillation operation of the magnetron 8. Thus, thawing of the food 2 is completed.

However, in the above-mentioned conventional thawing device it is difficult to calculate an:appropriate thawing time because the thawing time is calculated only based on the food weight, without any compensation based on the kind of the food and the frozen degree of the food. Moreover, only a local thawing is accomplished by the conventional thawing device. This is because the magnetron of the thawing device always generates uniform output energy. In some cases, the food is partially boiled.

SUMMARY OF THE INVENTION

Therefore, an object of the invention is to provide a method for thawing a food in a microwave oven, capable of optimally thawing the food and preventing a phenomenon that the food is partially boiled, by primarily heating the food for a predetermined time where the food is large in amount, turning the primarily heated food and then additionally heating the turned food, while eliminating the step of turning the food where the food is small in amount.

In accordance with the present invention, this object can be accomplished by providing a method for thawing a food in a microwave oven, comprising: a load determining step of determining whether the food to be thawed is large or small in amount, after heating the food for a first predetermined time; a small load thawing step of additionally heating the food with a first predetermined power for a second predetermined time when the food has been determined to be small in amount at the load determining step, and then completing thawing of the food; and a large load thawing step of executing a procedure of turning the food when the food has been determined to be large in amount at the load determining step, additionally heating the food with a second predetermined power for a third predetermined time, and then completing thawing of the food.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following detailed description of embodiments with reference to the accompanying drawings which are given by way of illustration only, and thus are not limitative of the present invention, in which.

DETAILED DESCRIPTION OF THE PREFERRED EMBODIMENTS

Figure 1:
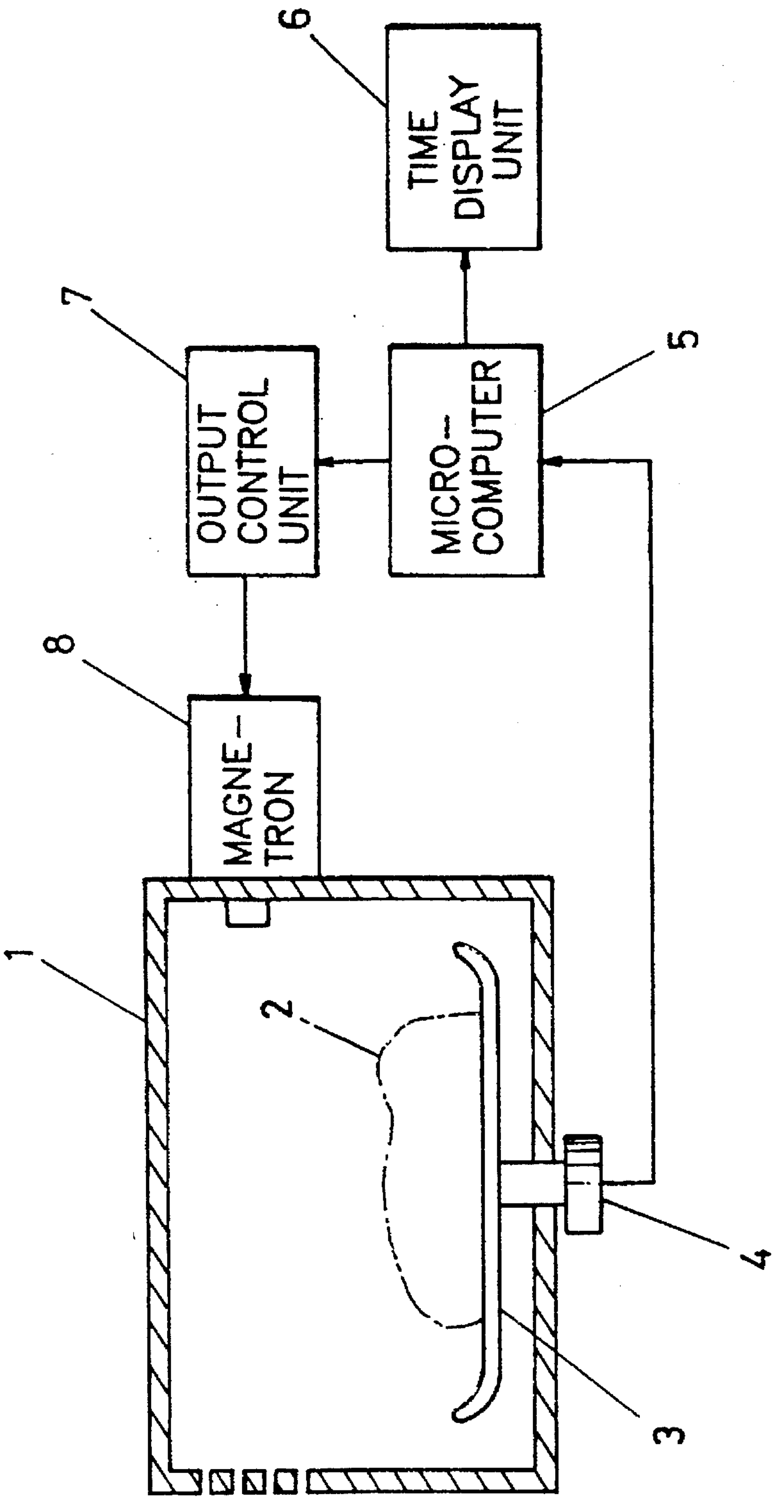
FIG. 1 CONVENTIONAL ART
FIG. 1 is a block diagram of a conventional thawing device equipped in a microwave oven.
Figure 2:
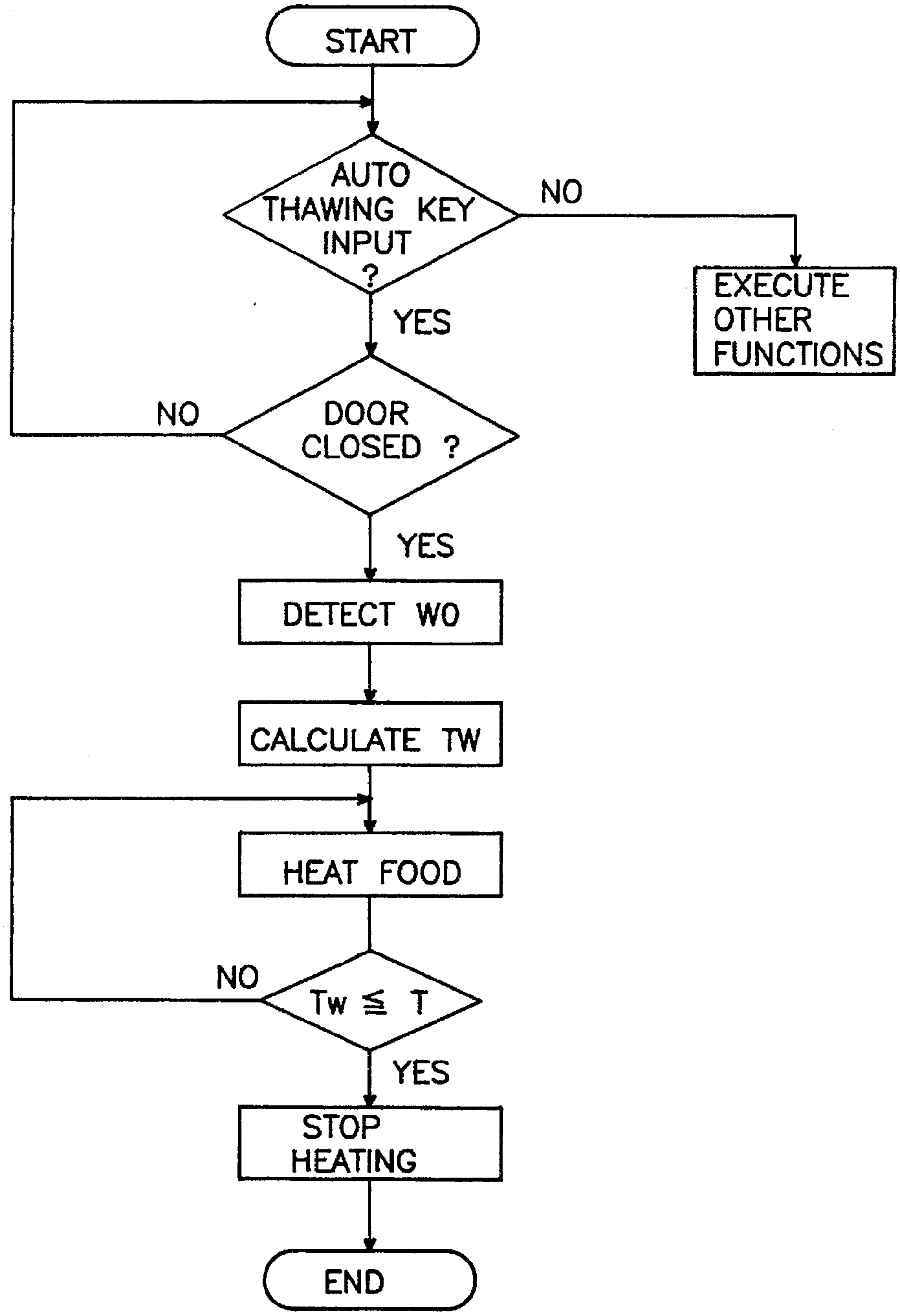
FIG. 2 CONVENTIONAL ART
FIG. 2 is a flow chart illustrating a conventional method for thawing a food using the thawing device shown in FIG. 1.
Figure 3:
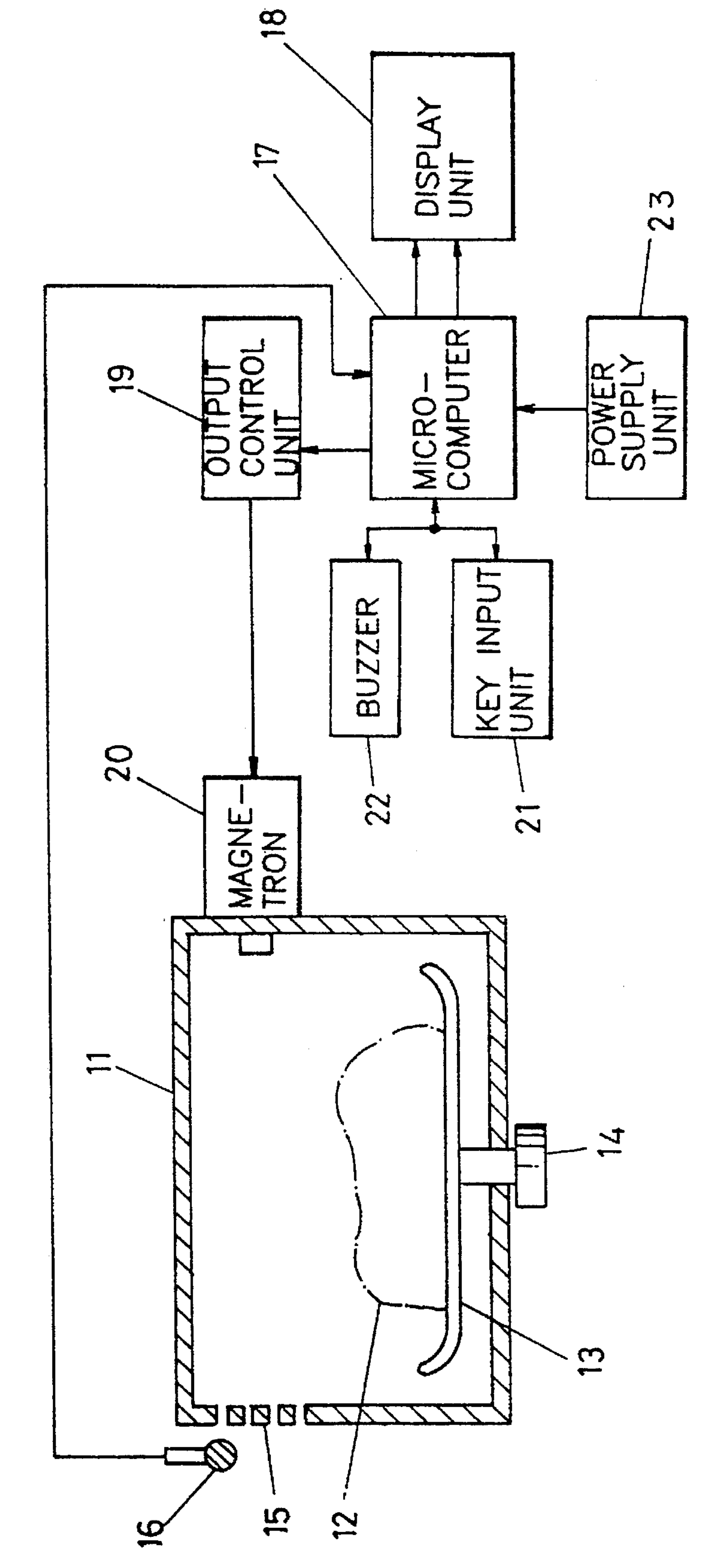
FIG. 3 is a thawing device equipped in a microwave oven and adapted to carry out a method for thawing a food in the microwave oven in accordance with the present invention.

Referring to FIG. 3, there is illustrated a thawing device equipped in a microwave oven and adapted to carry out a method for thawing a food in the microwave oven in accordance with the present invention. As shown in FIG. 3, the thawing device includes a heating chamber 11 for heating a food 12 disposed therein, a turntable 13 rotatably disposed in the heating chamber 11 and adapted to support the food 12 thereon, a turntable motor 14 for rotating the turntable 13, and an exhaust port 15 for exhausting water vapor and gas generated in the heating chamber 11. A gas sensor 16 is disposed near the exhaust port 15 so as to sense water vapor and gas exhausted through the exhaust port 15. The thawing device further includes a microcomputer 17 for calculating a thawing time for the food 12 based on an output signal from the gas sensor 16 and controlling various parts of the microwave oven, a display unit 18 for displaying the thawing time calculated by the microcomputer 17 and other information, a magnetron 20 for generating a radio frequency wave, an output control unit 19 for controlling driving of the magnetron 20 under a control of the microcomputer 17, a key input unit 21 for selecting a function desired by a user, a buzzer 22 for generating an alarm under a control of the microcomputer 17, and a power supply source 23 for supplying an electric power to the microcomputer 17.

Figure 4:
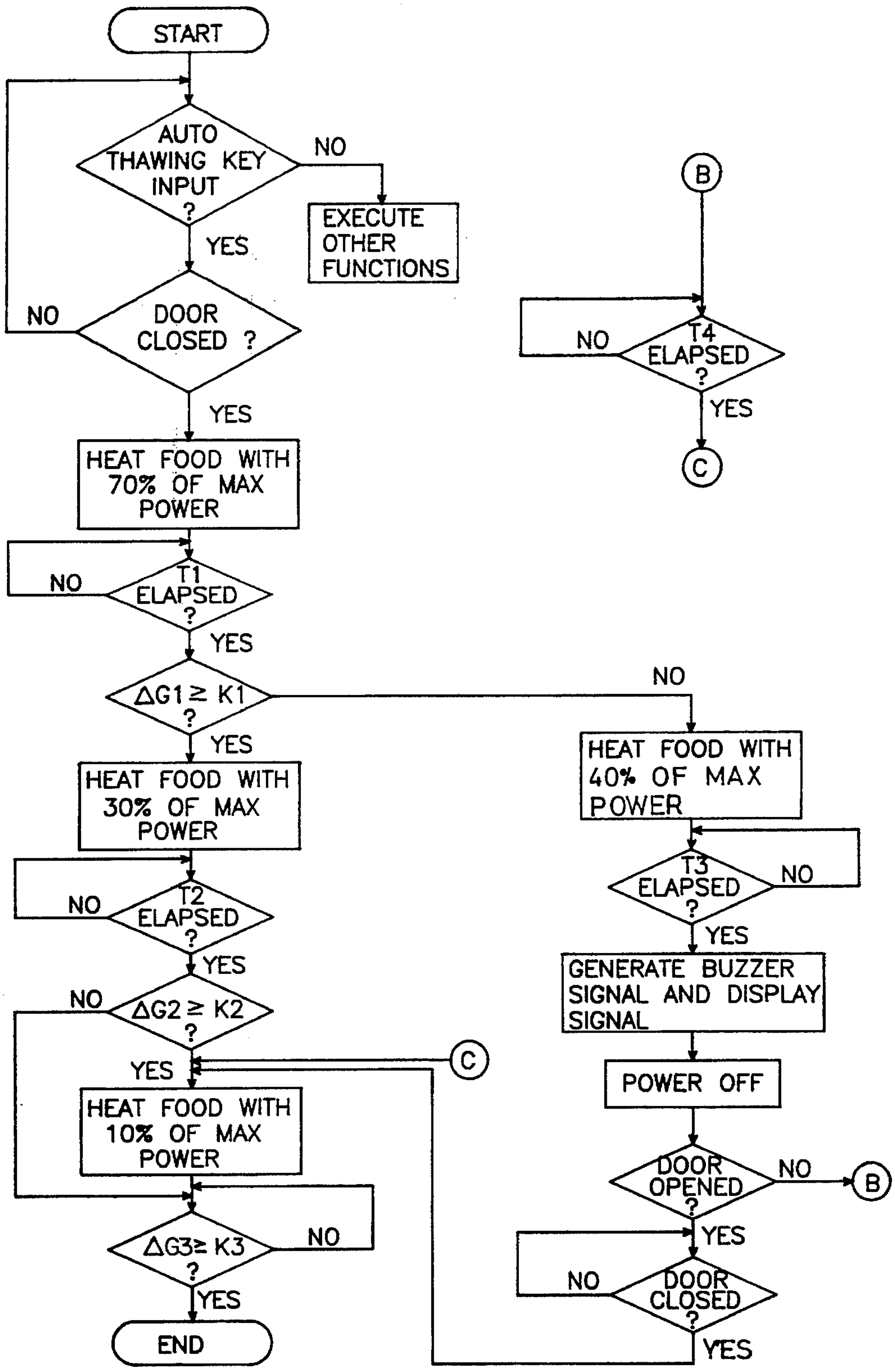
FIG. 4 is a flow chart illustrating the thawing method carried out using the thawing device, for example, shown in FIG. 3 in accordance with the present invention.

Now, the thawing method carried out using the thawing device having the above-mentioned construction in accordance with the present invention will be described, in conjunction with FIG. 4.

In accordance with the method of the present invention, first, the microcomputer 17 determines whether an input key signal generated from the key input unit 21 corresponds to an automatic thawing key signal. Where the generated input key signal does not correspond to the automatic thawing key signal, a function according to the input key signal is carried out. Where the current input key signal corresponds to the automatic thawing key signal, the microcomputer 17 checks a door condition of the microwave oven. When the door is at its opened state, the microcomputer 17 returns to the step of checking whether the input key signal corresponds to the automatic thawing key signal and begins its control operation again. On the other hand, when the door is at its closed state, an operation for heating the food 12 is initiated. For this operation, the microcomputer 17 controls the output control unit 19 so that the magnetron 20 is controlled to generate radio frequency waves with 70% of its maximum power for a predetermined time T1. By the radio frequency waves generated from the magnetron 20, the food 12 laid on the turntable 13 in the heating chamber 11 is heated.

During the heating operation, the gas sensor 16 senses water vapor or gas generated from the food 12 being thawed and generates an electrical signal indicative of the result of its sensing. The microcomputer 17 receives the output signal from the gas sensor 16. When the predetermined time T1 has elapsed, the microcomputer 17 compares a variation $\Delta G1$ in level of the signal received from the gas sensor 16 with a predetermined value K1 experimentally given. When the variation $\Delta G1$ is greater than or equal to the predetermined value K1, the microcomputer 17 determines that the food 12 is thawed at a low rate because it is small in amount. On the other hand, when the variation $\Delta G1$ is less than the predetermined value K1, the microcomputer 17 determines that the food 12 is thawed at a high rate because it is large in amount.

If the variation $\Delta G1$ is greater than or equal to the predetermined value K1 after the predetermined time T1 has elapsed, the microcomputer 17 controls the output control unit 19 so that the magnetron 20 further generates radio frequency waves with 30% of its maximum power for a predetermined time T2 to heat the food 12. When the predetermined time T2 has elapsed, the microcomputer 17 compares a variation $\Delta G2$ in level of the signal received from the gas sensor 16 with a predetermined value K2 experimentally given. When the variation $\Delta G2$ greater than or equal the predetermined value K2 after the predetermined time T2 has elapsed, the microcomputer 17 controls the output control unit 19 so that the magnetron 20 generates radio frequency waves with 10% of its maximum power to heat the food 12. This control operation is continued until a variation $\Delta G3$ in level of the signal received from the gas sensor 16 is greater than or equal to a predetermined value K3 experimentally given. When the variation $\Delta G3$ is greater than or equal to a predetermined value K3, the control operation of the microcomputer 17 is completed.

On the other hand, if the variation $\Delta G1$ is less than the predetermined value K1 after the predetermined time T1 has elapsed, the microcomputer 17 controls the output control unit 19 so that the magnetron 20 further generates radio frequency waves with 40% of its maximum power for a predetermined time T3 to heat the food 12. When the predetermined time T3 has elapsed, the microcomputer 17 activates the buzzer 22 and sends a food turning signal to the display unit 18 so as to display a condition that the food 12 should be turned. Thereafter, the microcomputer 17 controls the output control unit 19 so as to stop the heating operation until a procedure of turning the food 12 is completed.

When an opening and closing of the door of microwave oven is subsequently sensed, the microcomputer 17 determines that the food 12 has been turned. In this case, the microcomputer 17 controls the output control unit 19 so that the magnetron 20 generates radio frequency waves with 10% of its maximum power to heat the food 12. This control operation is continued until the variation $\Delta G3$ is greater than or equal to the predetermined value K3. When the variation $\Delta G3$ is greater than or equal to a predetermined value K3, the control operation of the microcomputer 17 is completed.

On the other hand, when the opening and closing of the door is not sensed even when a predetermined time T4 is elapsed under the food turning condition, the microcomputer 17 controls the output control unit 19 so that the magnetron 20 generates radio frequency waves with 10% of its maximum power to heat the food 12. This control operation is continued until the variation $\Delta G3$ is greater than or equal to the predetermined value K3. When the variation $\Delta G3$ is greater than or equal to a predetermined value K3, the control operation of the microcomputer 17 is completed. However, when the opening and closing of the door is sensed during the predetermined time T4, the microcomputer 17 controls the output control unit 19 so that the magnetron 20 generates radio frequency waves with 10% of its maximum power to heat the food 12. This control operation is continued until the variation ΔG3 is greater than or equal to the predetermined value K3. When the variation ΔG3 is greater than or equal to the a predetermined value K3, the control operation of the microcomputer 17 is completed.

Figure 5A:
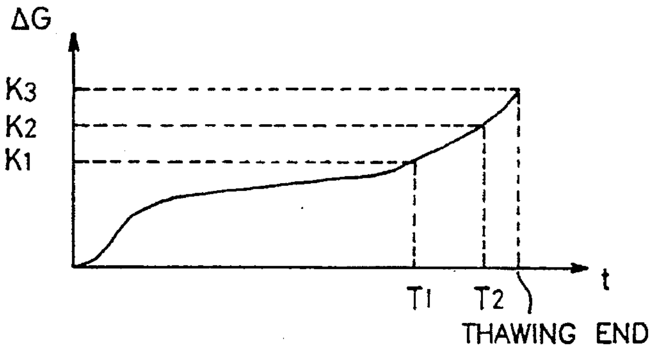
FIGS. 5A to 5C are waveform diagrams respectively illustrating signals generated from a gas sensor of the thawing device shown in FIG. 3 upon thawing a food under different conditions.
Figure 5B:
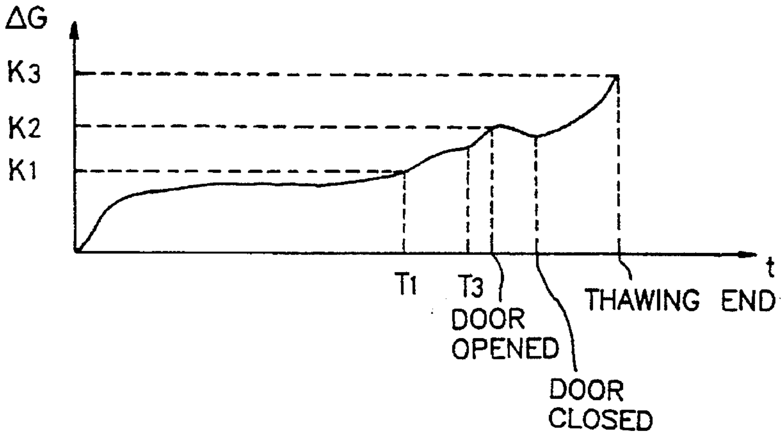
Figure 5C:
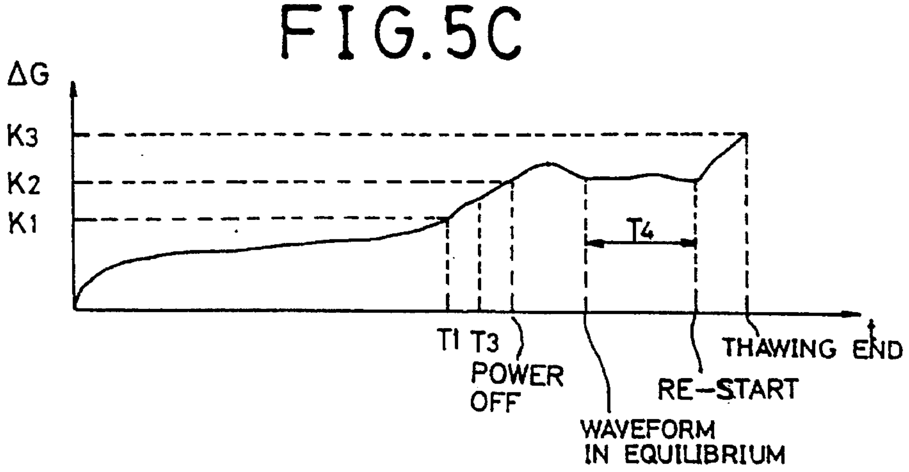

FIGS. 5A to 5C are waveform diagrams respectively illustrating signals generated from the gas sensor 16 upon thawing the food 12 under different conditions. FIG. 5A shows the case when the food 12 is small in amount. FIG. 5B shows the case when the food 12 is large in amount and thawed under a condition that the food 12 has been turned, while FIG. 5C shows the case when the food 12 is large in amount and thawed without turning. By referring to FIGS. 5B and 5C, it can be found that with the food in large amounts, the food turning procedure provides a better effect, as compared to having no food turning procedure.

As apparent from the above description, the present invention provides a method for thawing a food in a microwave oven, involving a procedure of turning the food by the user after thawing the food for a predetermined time where the food is large in amount, thereby capable of preventing the food from being partially boiled and, thus, achieving a more effective thawing.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of thawing a food in a microwave oven including a gas sensor, comprising the steps of:

(a) heating the food with a first predetermined power for a first predetermined time;

(b) comparing a first variation of an output signal from the gas sensor with a first predetermined value after said heating step (a);

(c) determining a relative size of the food to be thawed based on the comparison result from said comparison step (b);

(d) heating the food with a second predetermined power for a second predetermined time when the relative size of the food has been determined to be in a first range at said determining step (c);

(e) heating the food with a third predetermined power for a third predetermined time when the relative size of the food has been determined to be in a second range at said determining step (c);

(f) informing a user to turn the food after said heating step (e);

(g) comparing a second variation of the sensor output signal after the second predetermined time with a second predetermined value;

(h) heating the food with a fourth predetermined power if the second variation is compared to be greater than or equal to the second predetermined value at the step (g); and (i) comparing a third variation of the sensor output with a third predetermined value if the second variation is compared to be less than the second predetermined value;

wherein the comparison result from said comparing step (i) determines whether or not the food is to be additionally heated so as to thaw the food.

2. The method of claim 1, wherein the size of the food is determined to be in the first range when the first variation of the sensor output signal during the first predetermined time is equal to or greater than the first predetermined value and the size of the food is determined to be in the second range when the first variation of the sensor output signal is less than the first predetermined value.

3. The method of claim 1, wherein after said step (h) the food is continuously heated with the fourth predetermined power until the third variation of the sensor output signal is equal to or greater than the third predetermined value.

4. The method of claim 1, further comprising the steps of determining whether or not the food has been turned after said informing step (f), and heating the food with the fourth predetermined power when said determining step determines that the food has been turned or when a predetermine time has been elapsed.

5. The method of claim 1, wherein the first, second, third, and fourth predetermined powers include, respectively, 70% , 30%, 40%, and 10% of a maximum power allowed by the microwave oven.

6. The method of claim 1, further comprising the steps of:

determining whether or not the food has been turned after said informing step (f); and heating the food with a fourth predetermined power until the third variation of the sensor output signal is equal to or greater than third predetermined value, when said determining step determines that the food has been turned or when a predetermined time has been elapsed.

7. The method of claim 1, wherein said informing step (f) includes generating an alarm sound or a display signal.

8. The method of claim 1, wherein said sensor detects gas or water vapor generated from the food.

9. The method of claim 1, further comprising the step of providing an auto thawing key to initiate an automatic thawing of the food which begins with said heating step (a).

* * * * *